Figure 1:
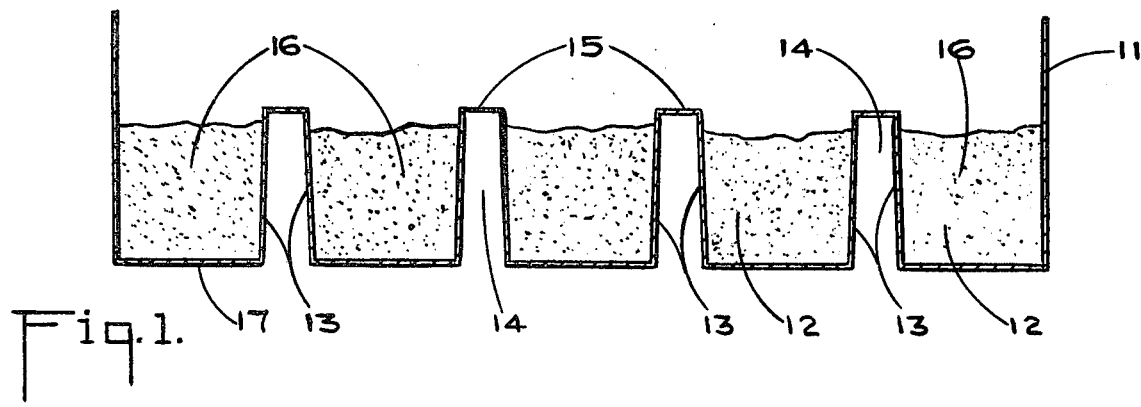

United States Patent [19]

Turillon

[11] 4,436,537
[45] Mar. 13, 1984

[54] MODULAR HYDRIDE CONTAINER

[75] Inventor: Pierre P. Turillon, Ramsey, N.J.

[73] Assignee: MPD Technology Corporation, Wyckoff, N.J.

[21] Appl. No.: 189,325

[22] Filed: Sep. 22, 1980

Related U.S. Application Data

[63] Continuation of Ser. No. 19,658, Mar. 12, 1979, abandoned.

[51] Int. Cl.³ ............................................. B01D 53/04
[52] U.S. Cl. .......................................... 55/387; 34/15
[58] Field of Search ................ 34/15; 55/16, 74, 208, 55/387; 62/48; 206/0.6, 0.7; 220/3.1, 20, 21, 23.8

[56] References Cited

U.S. PATENT DOCUMENTS

| | | | |
|---|---|---|---|
| 1,780,422 | 11/1930 | Geiler | 220/23.8 |
| 3,217,471 | 11/1965 | Silverman | 55/387 |
| 3,411,273 | 11/1968 | Duncan et al. | 55/387 |
| 3,508,414 | 4/1970 | Wiswall, Jr. et al. | 62/48 |
| 3,516,263 | 6/1970 | Wiswall, Jr. et al. | 62/48 |
| 3,630,007 | 12/1971 | Neumann | 55/387 |
| 3,713,273 | 1/1973 | Coffee | 55/74 X |
| 3,844,525 | 10/1974 | Parmett | 220/23.8 |
| 3,874,548 | 4/1975 | Buff, Jr. | 220/21 |
| 4,036,944 | 7/1977 | Blytas | 55/74 |
| 4,133,426 | 1/1979 | Turillon et al. | 55/16 X |
| 4,165,569 | 8/1979 | MacKay | 34/15 |
| 4,196,525 | 4/1980 | Ebdon et al. | 55/387 X |
| 4,249,654 | 2/1981 | Helversen | 34/15 X |

OTHER PUBLICATIONS

Proceedings of the Fourth International Symposium on Automotive Propulsion Systems, Feb. 1978, Conf-770430/1, (vol 11), UC-96, pp. 746–758.

Gorman et al., Hydride Heat Pump System For Building Air Conditioning Using High Temperature Solar Input, TRW, pp. 2-1 through 2-11, 3-1 to 3-16, 4-1 to 4-4, 5-1 through 5-5, 6-1 to 6-4 and R-1.

Gorman et al., Hydride Heat Pump vol. 1; Users Manual For Hycsos System Design Program, 5/12/78, TRW.

Primary Examiner—Robert H. Spitzer
Attorney, Agent, or Firm—Francis J. Mulligan, Jr.; Raymond J. Kenny

[57] ABSTRACT

Discloses a means for enhancing the transfer of hydrogen to and from solid hydridable material in a container and enhancing heat transfer to and from said hydridable material. The means whereby these enhancements are accomplished comprises a series of metallic trays arranged in non-nesting configuration in the hydrogen container.

3 Claims, 3 Drawing Figures

MODULAR HYDRIDE CONTAINER

The present application is a continuation of U.S. application Ser. No. 19,658 filed Mar. 12, 1979 of same title and inventorship, said U.S. application Ser. No. 19,658 being abandoned as of Sept. 23, 1980.

The present invention is concerned with a hydrogen containment unit and more particularly with a hydrogen containment unit including solid material which reversibly reacts with hydrogen in a given temperature range under the influence of pressure.

BACKGROUND OF INVENTION AND PROBLEMS

The use of solid hydridable materials to store hydrogen is disclosed in numerous patents, such as, for example, U.S. Pat. Nos. 3,508,514, 3,516,263 and 4,036,944. These solid hydridable materials are characterized by an interrelation of temperature, pressure and hydrogen content, such that, at any given temperature, the hydrogen content of the hydridable material is determined by the partial pressure of the hydrogen in contact with that material. Generally, as temperature rises it takes a greater partial pressure of hydrogen to maintain a given concentration of hydrogen in the hydridable material. The converse is true as temperature decreases. As hydrogen combines with the hydridable material, heat is given off, i.e., the reaction is exothermic. Conversely, when hydrogen is released from hydridable material it absorbs heat and the reaction is endothermic. The aforestated facts are the reasons why in storing hydrogen or combining and releasing hydrogen from hydridable material, it is most necessary that good heat transfer means be provided between the actual site of the hydriding or dehydriding reaction and the walls of a container. In addition, in order that the hydriding or dehydriding reaction takes place, it is necessary to provide gas paths which extend throughout the mass of hydridable material.

DISCOVERY AND OBJECTS

It has now been discovered that by means of a particular structure whereby the hydridable material is divided into a plurality of separate masses, the forestated problems and requirements can be readily provided for in the containment of hydrogen.

It is an object of the present invention to provide a novel hydrogen containment unit.

Figure 2:
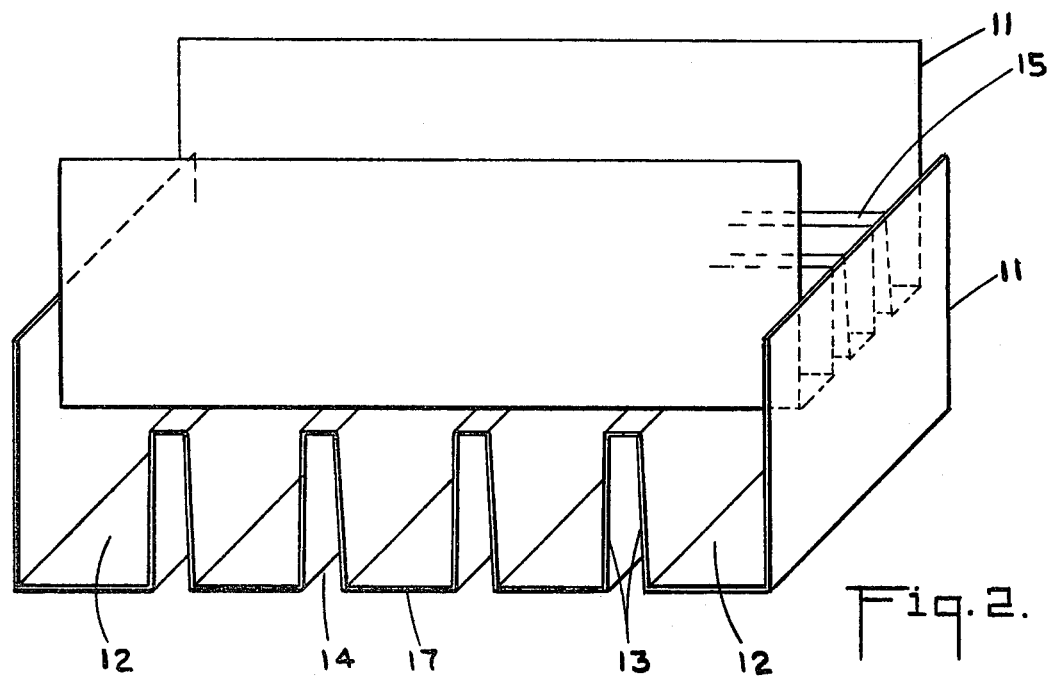
Figure 3:
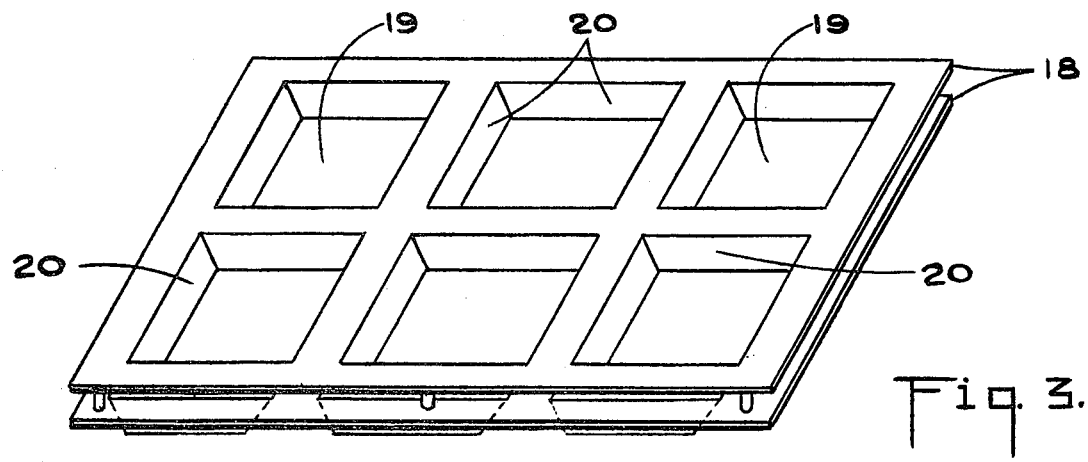

Other objects and advantages of the present invention will be taken in conjunction with the drawing, in which FIG. 1 is a cross-sectional view of a tray-like device used in the containment unit of the present invention, FIG. 2 is a perspective view of a pair of the tray-like devices shown in FIG. 2, and FIG. 3 is a perspective view of an alternative form of a tray-like device used in the containment units of the present invention.

GENERAL DISCLOSURE

Generally speaking, the present invention contemplates a hydrogen containment unit which includes a conventional container, eg. steel pressure bottle for gaseous hydrogen; some means, for example, valved piping, to introduce gaseous hydrogen into and draw gaseous hydrogen from the container; a multiplicity of trays in the container, each tray having at least one depressed storage zone for pulverized, solid material and being made of a hydride-resistant material of good heat conductivity; hydridable material in each of the depressed storage zones in the trays, with the trays being stacked in the container in a non-nested arrangement. The result of the conventional container, the conventional means for introducing and removing gas hydrogen from the container and the multiplicity of trays in the container arranged in non-nesting fashion is a labyrinth of gas transport passages extending through the container and a heat transfer network extending throughout the bulk of the volume of said containment means. Advantageously, the trays abut on or otherwise are in heat conductive relation with the walls of the container.

THE DRAWINGS

The present invention is more particularly described in reference to the drawing. In the drawing, the conventional hydrogen container and the piping and valving means have been omitted. FIG. 1 illustrates, in cross-section, tray 11 conveniently made of heat conductive metal, such as, aluminum, copper, stainless steel, or the like, which is resistant to the effects of a hydrogen atmosphere and exhibits a thermal conductivity of greater than about 0.1 calorie/second/°C. when measured through a plate 1 cm across of area of 1 cm$^2$ within the temperature range a hydrogen storage. Tray 11 includes depressed zones 12 bounded by walls 13 which walls 13 bound gas passages 14. Gas passages 14 are defined by walls 13, wall heads 15 and cooperating portions of adjacent trays as shown in FIG. 2. Hydridable material 16 rests in depressed zones 12 as shown in FIG. 1. It is advantageous that the trays be formed so that bottoms 17 of zones 12 are smaller in area than the tops of zones 12. This permits freedom of motion of powdered hydridable material 16 during the expansion attending the hydriding reaction and minimizes localized pressure which might tend to distort tray 11. A variation of tray 11 is shown as tray 18 in FIG. 3. Depressed zones 19 in FIG. 3 have smoothly sloping side walls 20 and greater top area than bottom area for the aforestated purpose.

Those skilled in the art will appreciate that the particular shapes of the trays as depicted in the drawing can be varied, as well as, the shapes and apparent dimensions of the depressed zones holding the hydridable material. It is advantageous that the hydridable material be alloys or intermetallic compounds.

Hydrogen storage materials can be any of the HYSTOR ™ materials sold by MPD Technology Corp. of Waldwick, NJ, such as alloys having the chemical formulas of FeTi, (Fe$_{0.9}$Mn$_{0.1}$)Ti, (Fe$_{0.8}$Ni$_{0.2}$)Ti, CaNi$_5$, (Ca$_{0.7}$M$_{0.3}$)Ni$_3$, (Ca$_{0.2}$M$_{0.8}$)Ni$_5$, MNi$_5$, LaNi$_5$, (CFM)Ni$_5$, LaNi$_{4.7}$Al$_{0.3}$, MNi$_{4.5}$Al$_{0.5}$, Mg$_2$Ni and Mg$_2$Cu (M=mischmetal and CFM=cerium free mischmetal). Other reversible hydride-forming materials, either metals or non-metals, can also be used in the apparatus of the present invention.

Although the present invention has been described in conjunction with preferred embodiments, it is to be understood that modifications and variations may be restored to without departing from the spirit and scope of the invention, as those skilled in the art will readily understand. Such modifications and variations are considered to be within the purview and scope of the invention and appended claims.

I claim:

1. A hydrogen containment unit comprising
   a. a container for gaseous hydrogen, b. valved piping means to introduce gaseous hydrogen into and withdraw gaseous hydrogen from said container, c. a multiplicity of open-topped metallic trays in said container each tray
   1. having at least one depressed storage zone for pulverized solid material and
   2. being made of a hydrogen resistant material of good heat conductivity d. a multiplicity of masses of pulverized solid hydridable material in said depressed storage zones of said multiplicity of trays said masses of hydridable material being confined solely by said depressed storage zones and being open to reaction with gaseous hydrogen in said container, and e. said multiplicity of trays being stacked unnested in said container to thereby define a labyrinth of hydrogen gas transport passages devoid of pressure drop barriers and communicating with all of said multiplicity of masses of hydridable material and a heat transfer network extending throughout the bulk of the volume of said container.

2. A containment unit as defined by claim 1, wherein the hydridable material is an alloy or an intermetallic compound.

3. A containment unit as defined by claim 1, wherein the area of the bottom of said at least one depressed storage zone is less than the area of the top of said at least one storage zone and said storage zones have smoothly sloping sides.

* * * * *